United States Patent [19]
Siciliano

[11] 3,715,377
[45] Feb. 6, 1973

[54] PREPARATION OF ORGANOSILICONE ESTERS

[75] Inventor: George R. Siciliano, Ballston Lake, N.Y.

[73] Assignee: General Electric Company

[22] Filed: Dec. 16, 1971

[21] Appl. No.: 208,908

[52] U.S. Cl. ............260/448.2 E, 260/398, 260/408, 260/410.5, 260/410.6, 260/410.9 R
[51] Int. Cl. ................................................C07f 7/08
[58] Field of Search ....260/448.2 E, 398, 408, 410.5, 260/410.6, 410.9 R

[56] References Cited

UNITED STATES PATENTS

| | | | |
|---|---|---|---|
| 2,833,802 | 5/1958 | Merker | 260/448.2 E |
| 2,872,434 | 2/1959 | Barnes | 260/448.2 E X |
| 3,464,955 | 9/1969 | Bluestein | 260/448.2 E X |
| 3,622,609 | 11/1971 | Mironov et al | 260/448.2 E |

*Primary Examiner*—Daniel E. Wyman
*Assistant Examiner*—P. F. Shaver
*Attorney*—Donald J. Voss et al.

[57] ABSTRACT

A process for forming an organosilicone ester which comprises reacting a carboxysilicone and an alcohol in the presence of a sorbent-acid catalyst system.

17 Claims, No Drawings

PREPARATION OF ORGANOSILICONE ESTERS

BACKGROUND OF THE INVENTION

This invention relates to a process for forming organosilicone esters and in particular, this invention relates to a process for forming ester polysiloxanes useful as brake fluids by esterifying carboxysilicone polymers.

Various methods have been proposed for the preparation of organosilicone esters. One such method is disclosed in copending U.S. Patent Application of Frank J. Traver entitled "Polysiloxanes Useful as Brake Fluids", Ser. No. 125,398 filed Mar. 17, 1971. That application discloses a process by which the ester polysiloxanes are obtained by esterifying an alkenoic acid with an alcohol and then taking the resulting alkenoic acid ester and reacting it with a hydropolysiloxane in the presence of a platinum catalyst so that the alkenoic acid ester is added onto the hydrogens located in the hydropolysiloxane by an SiH-olefin addition reaction. Such a process, however, requires the use of a platinum catalyst which is very expensive and which is easily contaminated.

In order to overcome the disadvantages of the above process, a process has been developed which is a direct method for forming the estersilicone from starting materials which are all standard materials well known in silicon chemistry. Such a process is described in copending U.S. Patent Application of Frank J. Traver entitled "A process for Producing Polysiloxane Useful as Brake Fluid", Ser. No. 125,396 filed Mar. 17, 1971, disclosure of which is incorporated herein by reference. That application discloses a process whereby carboxy-containing polysiloxanes are initially obtained and are then reacted with an alcohol in the presence of an acid catalyst such as sulfuric acid or toluene sulfonic acid. The use of sulfuric acid suffers from the disadvantages of being insoluble in many of the siloxane-alcohol systems undergoing the esterification and of having to be neutralized after the reaction. Aromatic sulfonic acids such as toluene sulfonic acids and xylene sulfonic acids are soluble in many of the esterification reactants but must be neutralized after the reaction is completed. The neutralization is accomplished employing a weak base such as an aqueous $NaHCO_3$ solution. The neutralization, however, causes reversion of some of the ester groups back to the carboxy group. This, in turn, decreases the yield and contaminates the product. Moreover, during the neutralization, large quantities of soaps are formed which are quite difficult to remove from the product. In addition, various acids employed in the reaction cause discoloration of the product if not removed from the product.

The object of the present invention is to provide an esterification process which overcomes the above-discussed problems.

In addition, it is an object of the present invention to provide an esterification process which is suitable for preparing ester polysiloxanes possessing the properties needed for use as brake fluids. When a fluid is to be used as a brake fluid it is desirable that it meets certain performance criteria as well as certain suggested criteria for safety purposes, that is, the brake fluid must be such so that the brakes will operate efficiently and failure of the brakes will not result. The suggested criteria which a brake fluid must meet encompass an original equilibrium reflux boiling point determination, a wet equilibrium reflux boiling point determination, flash point determination, kinematic viscosity determination, pH value, brake fluid stability which encompasses high temperature stability and chemical stability, a corrosion determination, evaporation determination, water tolerance determination at low temperatures and at 60° C, compatibility determination at low temperatures, a resistance to oxidation determination, effects on rubber determination and stroking property determination. The original equilibrium reflux boiling point determination is desired in order to determine that the brake fluid have a sufficiently high boiling temperature so that it will not boil at operating temperatures to which the brake fluid is subjected through the normal operation of the vehicle. It can easily be seen that if the equilibrium reflux boiling point is too low, that the vaporized brake fluid would easily rupture the brake hoses, resulting in failure of the brakes. Further, the brakes would not operate with vapor in the hydraulic lines.

A wet equilibrium boiling point is desired so as to test whether the inclusion of a certain amount of water in the brake fluid would result in the formation of vapor in the normal operating temperatures of the brake fluid, which would cause the rupture of the brake lines and result in failure of the brakes.

A flash point test is necessary to determine whether the brake fluid has a sufficiently high flash point. If the brake fluid does not have a sufficiently high flash point, it will start burning at the normal operating temperatures of the brakes. It is also desirable in this respect to test the fire point and the autogenous ignition temperature. For instance, if the fire point is close enough to the flash point under normal operating conditions when the flash point of the brake fluid is exceeded, the brake fluid might continue burning and would thus not only result in failure of the brakes but cause the automobile to burst into flames. In accordance with this reasoning, it is also desirable to consider the autogenous ignition temperature, for if this temperature is not considerably higher than the flash point, it can be seen that again, under operating conditions when the flash point of the fluid is exceeded and in that case if the autogenous ignition temperature of the fluid is also exceeded, the brake fluid might burn so quickly that not only will the brakes fail but the occupant of the automobile will not have time to leave the automobile before a major fire ensues.

A kinematic viscosity test is necessary to determine whether the brake fluid will have sufficiently low viscosity at very low temperatures and a sufficiently minimum viscosity at high temperatures so that the brakes will be in acceptable operating condition at these extreme temperatures.

A pH test is used to determine the pH of the brake fluid such that it is not acidic or too basic so that it will corrode and eat away the hydraulic lines or the hydraulic brake drum cylinders in which the fluid is located.

A high temperature stability test is necessary to determine the stability of a fluid at high temperatures so that it will not degrade at the specified temperatures to other compounds or products which would be unworkable fluids for a brake system.

A chemical stability test is needed to determine whether if the brake fluid is mixed with a glycol brand brake fluid it will not react with this fluid.

A corrosion test, as with the pH test, is needed to determine whether the brake fluid would eat away the metal in the hydraulic lines or the rubber in the brake drum cylinders or the rubber that may form part of the hydraulic lines and thus cause early failure of the brakes.

An evaporation test is needed to determine whether the brake fluid will evaporate at certain high temperatures and thus not only form undesirable vapor in the brake lines but further will result in the dissipation of the brake fluid through the hydraulic lines and master cylinder into the atmosphere so that it would need constant replacement. Excessive vapor in the hydraulic lines would cause brake failure.

A water tolerance test at low temperature is needed to determine whether the fluid with the water it would pick up from the atmosphere would result in the water crystallizing out to form ice at low temperatures, which ice would impair the performance of the brakes.

A water tolerance test at high temperatures is needed to determine whether the water which is picked up by the fluid from the atmosphere would evaporate at the high temperature and form vapor in the brake lines which would impair the performance of the brakes.

A compatibility test is needed to determine at both low and high temperatures whether the brake fluid would operate properly when it is mixed with glycol based brake fluid and result in impairment of the performance of the brakes. This test is needed because it frequently becomes necessary to replace part of the brake fluid in an automobile with additional fluid so it is desirable for any new brake fluid which is admitted to the market to be compatible with glycol based brake fluids.

A resistance to oxidation test is necessary in order to determine whether the brake fluid will oxidize in the presence of the oxygen in the air to form different products which would be unsuitable as brake fluid components.

A stroking properties test is necessary in order that the fluid can be tested in a simulated operation that would be comparable to the use of the fluid in an automobile and thus determine the performance of the brake fluid over an extended period of time so that it may be determined that the brake fluid tested does not have any unforeseen effects which will degrade the brake hydraulic system or result in failure of the brakes.

At the present time, there are no brake fluids presently in the market which pass all of the above tests with acceptable overall performance. The desirable specifications or ratings in the above-suggested tests require the fluid to have a higher equilibrium reflux boiling temperature and flash point than of the presently available glycol based fluids.

The brake fluids presently on the market are basically polyether glycols which vary from case to case, depending on the type of polyether units and the number of polyether units in the polymer chain. Such brake fluids are hygroscopic in that they will pick up large quantities of water from the atmosphere. Problems are associated with the packaging and handling of such brake fluids since unless extreme precautions are exercised these brake fluids will pick-up large amounts of water from the atmosphere due to their hygroscopicity which will result in a brake fluid with poor performance characteristics as well as a brake fluid that is unsafe because it can cause a failure of the brakes. It is undesirable to have excees water since it will separate out at low temperatures such as $-40°$ F in that the water will form ice crystals and may cause the brake drum cylinder to freeze, thus causing failure of the brakes. Further, it is undesirable to have large amounts of water in the brake fluid in that at the high temperatures, which are commonly present in the operation of automobile brakes, the water will evaporate to form vapor which may rupture the hydraulic lines causing failure of the brakes and possibly cause the brake fluid to burst into flames or the vapor may cause a very sluggish, inefficient braking action.

It is thus desirable to have a brake fluid on the market which picks up a minimum amount of water through hygroscopicity and which is compatible with the amount of water it picks up from the atmosphere so that when the brake fluid is subjected to temperatures as low as $-41°F$, brake failure does not result. The brake fluids which meet the above tests are disclosed in the present case as well as in the application of Frank J. Traver, Ser. No. 125,398; Frank J. Traver, Ser. No. 125,397; Frank J. Traver, Ser. No. 125,396, all filed on Mar. 17, 1971; and Frank J. Traver, Ser. No. 132,556, filed on Apr. 8, 1971.

The process of the present invention is suitable for preparing polysiloxanes which have been found to be very useful as brake fluids. The present invention provides an efficient and effective method for the preparation of estersilicones and particularly those ester polysiloxanes which have all the advantageous properties and meet all of the specifications set forth above in the discussion of brake fluids.

The present invention provides a very simple and direct means for forming estersilicones. The process of this invention may be easily followed by those skilled in the art to obtain estersilicones in high yield.

SUMMARY OF THE INVENTION

The present invention is concerned with a process for preparing an organosilicone ester by reacting a carboxysilicone containing in its molecule at least one unit of the formula:

(1) 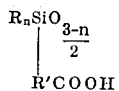

wherein R is selected from monovalent hydrocarbon radicals, halogenated monovalent hydrocarbon radicals and monovalent cyanoalkyl radicals; R' is selected from divalent hydrocarbon radicals, halogenated divalent hydrocarbon radicals, and divalent hydrocarbon radicals containing at least one ether linkage; and n varies from 0 to 3 and an alcohol selected from

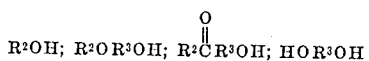

and $HOR^3(OH)_s$ wherein $R^2$ is a monovalent hydrocarbon radical, $R_3$ is a divalent hydrocarbon radical, $R^s$ is a polyvalent hydrocarbon radical with $s$ plus 1 hydroxyl groups attached thereto, and $s$ is a whole number that varies from 1 to 5; in the presence of an effective catalytic amount of a sorbent-acid catalyst system.

DESCRIPTION OF THE PREFERRED EMBODIMENTS

The carboxysilicone compounds employed as reactants in the present invention contain at least one unit of the formula:

(1) 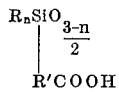

R'COOH

Preferably the carboxysilicone compound used in the process of the present invention is a polysiloxane polymer of the structure:

(2) 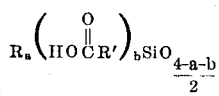

wherein R in formulas (1) and (2) is a monovalent hydrocarbon radical or a halogenated monovalent radical or a cyanoalkyl radical; R' in formulas (1) and (2) is a divalent hydrocarbon radical or a halogenated divalent radical or a divalent hydrocarbon radical containing at least one ether linkage; $n$ varies from 0 to 3; $a$ varies from 1.1 to 2.02; $b$ varies from 0.023 to 1.00; and the sum of $a+b$ varies from 2.024 to 3.00. The polysiloxane polymers of formula (2) can be employed in the preparation of brake fluids.

The radicals R and R' appearing in formulas (1) and (2) are well known in the art and are typified by radicals usually associated with silicon-bonded organic groups in the case of R and are generally associated with divalent hydrocarbon radicals in the case of R'.

The organic radicals represented by R include monovalent hydrocarbon radicals, halogenated monovalent hydrocarbon radicals and cyanoalkyl radicals. Thus, the radical R may be alkyl, such as methyl, ethyl, propyl, butyl, octyl; aryl radicals such as phenyl, tolyl, xylyl, napthyl radicals; aralkyl radicals such as benzyl, phenylethyl radicals; olefinically unsaturated monovalent hydrocarbon radicals such as vinyl, allyl, cyclohexenyl radicals; cycloalkyl radicals such as cyclohexyl, cycloheptyl radicals; halogenated monovalent hydrocarbon radicals such as dichloropropyl, 1,1,1-triflurorpropyl, chlorophenyl, dibromophenyl, chloromethyl, and other such radicals; cyanoalkyl radicals such as cyanoethyl, cyanopropyl, etc. Preferably, the radicals represented by R have less than eight carbon atoms and in particular it is preferred that R be methyl, ethyl or phenyl. The radicals represented by R' may be any alkylene or arylene radicals or halogen derivatives thereof or alkylene or arylene containing ether linkage of less than 20 carbon atoms such as methylene, ethylene, propylene, chloroethylene, various isomers of the phenylene radicals or substituted phenylene radicals; chlorophenylene, dibromophenylene, $-CH_2CH_2OCH_2CH_2-$, and $-(CH_2)_3OCH_2-$. More specifically, R' is selected from alkylene or arylene radicals of up to 20 carbon atoms and R is preferably an alkyl radical such as methyl. Further, more preferably, $a$ varies from 1.23 to 2.05, $b$ varies from 0.055 to 0.92, and the sum of $a+b$ varies from 2.074 to 2.5. In the preferred embodiment R' is propylene or ethylene. Further, R' can be arylylene, alkenylene, as well as alkynylene.

The preferred structural formula which comes within the average unit formula as set forth in formula (2) is as follows:

(3) 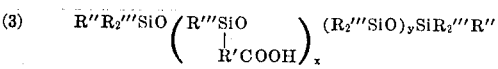

In this formula, each R''' individually is a monovalent hydrocarbon radical or a halogenated monovalent hydrocarbon radical; and each R'' individually is the same as R''' or is $-C_gH_{2g}CN$. Preferably in this formula R''' is methyl, $x$ varies from 1 to 10, $y$ varies from 1 to 15, $g$ varies from 1 to 20, and most preferably $g$ is 2 or 3.

The referred carboxysilicone compounds employed in the present invention can be obtained by the method set forth in Docket 8SI-1070. This method will be described below with respect to the preparation of carboxyalkyl polysiloxanes for convenience. However, it is understood that other carboxyorgano polysiloxanes can be similarly prepared by employing other starting materials. This method comprises reacting in the presence of water a diorganopolysiloxane of the formula:

(4) 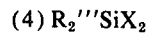

with a cyanochlorosilane of the formula:

(5) 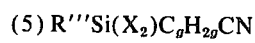

and a silane of the formula:

(6) 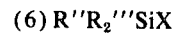

where R''' is selected from monovalent hydrocarbon radicals and halogenated monovalent hydrocarbon radicals. R'' is the same as R''' or $-C_gH_{2g}CN$, X is a hydrolyzable radical selected from halogen, alkoxy, aryloxy, and acyloxy radicals, $g$ is a whole number that varies from 1 to 20.

The preferred carboxy polysiloxanes may also be prepared by taking the silanes of formula (4) and formula (5) separately and condensing them in the presence of a strong base or acid to form the corresponding cyclopolysiloxanes. The corresponding cyclopolysiloxanes may then be equilibrated with an appropriate disiloxane as a chain-stopper to form the desired polysiloxane having carboxy groups thereon. The equilibration of the cyclopolysiloxanes and the disiloxanes preferably is carried out in the presence of an acid to form the desired acid polysiloxane.

The diorganosilanes of formula (4) are preferably ones in which X is equal to chlorine or equal to another type of halogen. However, it is to be understood in the present invention that X may be also represented by an acetoxy, aryloxy or an acyloxy hydrolyzable radical. Such diorganosilanes are well known in the art. The silanes of formula (5) are also well known in the art.

The cyanosilanes of formula (5) may be prepared by various methods which are known in the art and which will be set forth in detail below.

Illustrative of the diorganohalogensilanes within the scope of formula (4) are dimethyldichlorosilane, methylphenyldichlorosilane, diphenyldichlorosilane, ethylpropyldichlorosilane, etc. Products within the scope of formula (5) include, for example, methyl-beta-cyanoethyldichlorosilane, phenyl-beta-cyanoethyldichlorosilane, phenyl-gamma-cyanopropyldichlorosilane, cyanohexyl-beta-cyanopropyldichlorosilane. The cyanodiorganochlorosilanes of formula (5) are characterized by the fact that the nitrile group is attached to a carbon atom which is at least one carbon atom removed from the silicon atom. For example, the cyano group is beta or gamma with respect to the silicon atom. Silanes which come within the scope of formula (6) are as follows: trimethylchlorosilane, dimethylphenylchlorosilane, dimethyl-beta-cyanoethylchlorosilane, and diphenylgamma-cyanopropylchlorosilane.

To form the carboxy polysiloxanes of formula (3), the diorgano hydrolyzable silane of formula (4), the cyano hydrolyzable silane of formula (5) and the silane of formula (6) are mixed together in the proportion that the siloxy groups appear in the final ester polysiloxane. This mixture is then slowly added to water to facilitate the hydrolysis and condensation of the silicon-bonded halogen hydrolyzable atoms and the hydrolysis of the nitrile groups to carboxyl groups. In general, the amount of water employed in the hydrolysis and condensation reaction is sufficient to hydrolyze all the silicon-bonded hydrolyzable atoms and also sufficient to provide a solvent for the acid which may result from the hydrolysis, which may be hydrogen chloride assuming that the hydrolyzable radical is chlorine. Preferably, the amount of water is maintained at a value sufficiently low to provide a concentrated hydrogen chloride solution or other acid solution or even so low as to be insufficient to dissolve all of the acid formed. Where the amount of water is insufficient to dissolve the acid generated, it is desirable to maintain the reaction mixture under pressure, such as a pressure of about 50 lbs/in² so as to avoid loss of the acid. In general, the amount of water employed is from about 0.75 to about 1.25 parts per weight of the mixture of the three hydrolyzable silanes of formulas (4), (5), and (6). The hydrolysis and condensation reaction is found to be exothermic and it is found that the temperature increases to within a range of 25° to 100° C and preferably to a maximum in the range of about 70° C during the course of the hydrolysis and condensation, which is effected in the period of time of about generally 1 to 8 hours and preferably 1 to 6 hours. After completion of the hydrolysis and condensation reaction, water and acid are stripped to yield a reaction mixture containing the precipitate of ammonium halogen from the hydrolysis of the nitrile group to the carboxy group. This precipitate is filtered and the reaction mixture is then dried. In order to insure a uniform composition, the dried and filtered hydrolyzate is equilibrated with sulfuric acid. The conditions under which this equilibration is effected can vary within extremely wide limits. In general, satisfactory results are obtained by adding from about 0.1 to 5 percent by weight of sulfuric acid and preferably 86 percent by weight to 96 percent by weight of sulfuric acid to the hydrolyzate and heating the reaction mixture at a temperature of from about 70° to 125° for a period of time from about 1 to 6 hours, and preferably 1 to 3 hours. At the end of this time, the reaction mixture is cooled and washed with water until the wash water is neutral. This results in the carboxypolysiloxane of formula (3).

The carboxypolysiloxane of formula (4) may also be obtained by an alternate procedure. Assuming the hydrolyzable radical in formulas (4), (5), and (6) is chlorine, such polysiloxanes can be produced by following the procedure involving the hydrolysis of one or more of the above hydrocarbon-substituted chlorosilanes, in which the substituents consist of saturated hydrocarbon groups which compounds of formulas (4), (5), and (6) are first hydrolyzed separately. The silane of formula (6), when hydrolyzed, will produce a disiloxane which can be separated by distilling off the other constituents in the reaction mixture and the volatiles. The silanes of formulas (4) and (5) are hydrolyzed separately to produce a mixture of linear and cyclic polysiloxanes. The two crude hydrolyzates are the then polymerized by treatment with KOH and being heated at elevated temperatures to form a mixture of low boiling, low molecular weight cyclic polymers, having the formulas:

(7) $(R_2'''SiO)_c$ (8) $[(NCC_gH_{2g})R'''SiO]_d$ where $c$ and $d$ are whole numbers varying from 3 to 10. The crude hydrolyzate containing the above cyclics also contains undesirable materials such as monofunctional and trifunctional chlorosilane starting material. The hydrolyzates of cyclic and linear siloxanes are fractionally distilled and there is collected two pure products containing low boiling, low molecular weight cyclic polymers free of any significant amount of monofunctional and trifunctional groups.

Because of the nitrile group, when the hydrolyzate of the chlorosilane of formula (5) is hydrolyzed, it is preferred that a strong acid be utilized as the catalyst. Examples of such strong acids useful as catalysts in the depolymerization reaction are sulfuric acid and toluene sulfonic acid. Thus, after the two hydrolyzates are contacted with a strong acid and heated to a temperature above 150° C for a period of 1 to 10 hours and preferably 4 to 8 hours, the reaction mixture can be distilled to produce a distillate consisting essentially of low molecular weight cyclic diorgano polymers free of any significant amounts of monofunctional and trifunctional groups. These cyclic siloxanes which are prepared in accordance with the above procedure and which are represented by formulas (7) and (8) are added in the desired proportions in the reaction vessel so as to be subjected to an equilibration reaction to form the carboxypolysiloxane of formula (3). To this mixture of the cyclic polysiloxanes of formulas (7) and (8) there is added in a desired proportion a disiloxane of the formula:

(9) $[R..R_2'''Si]_2O$ in the correct proportions so that the disiloxane can function as a chain-stopper to limit the chain length of the polysiloxanes formed. The reaction mixture can then be equilibrated to form the carboxypolysiloxane of formula (3).

In order to carry out the equilibration reaction, there must be added to the reaction mixture a catalyst which is selected from a strong base or a strong acid such as potassium hydroxide, sodium hydroxide, sulfuric acid, toluene sulfonic acid and other acids. It is preferred to use a strong acid, such as toluene sulfonic acid, as the catalyst in order to preserve the carboxy group in the polysiloxane product. Functional compounds that may be employed satisfactorily for controlling polymer growth within the scope of the disiloxane of formula (9) include among other hexamethyldisiloxane, tetramethyldiethoxydisiloxane, diethyltetraethoxydisiloxane, and divinyltetraethoxydisiloxane. The equilibration reaction is carried out from 2 to 4 hours until about 85 percent of the cyclic diorganosiloxanes have been converted to polymers end-stopped with monofunctional groups. When the 85 percent conversion point has been reached, there are just as many polymers being converted to cyclic siloxanes as there are cyclic siloxanes being converted to the polymer. At that time there is added to the mixture a sufficient amount of an acid donor or a base such as ammonium hydroxide that will neutralize the toluene sulfonic acid so as to terminate the polymerization reaction. The cyclic diorganosiloxane reactants that are left are then distilled off to leave the carboxypolysiloxane fluid which is useful in the present invention.

The above procedure has been described for the case where R''' is preferably methyl. However, the above procedure will apply in the case where R''' is represented by groups other than methyl, such as ethyl, vinyl, etc. More specifically with respect to the case where R''' is methyl, g is equal to 2 in formulas (4), (5), and (6). Preferably carboxymethylpolysiloxane can be produced by equilibrating hexamethyldisiloxane with octamethyltetrasiloxane and tetramethyltetra-beta-carboxyethyltetrasiloxane in the proper molar proportions in the presence of 3 percent of acid treated clay, such as acidified Fuller's Earth and the reaction mixture is heated for 5 hours at 100° to 120° C to equilibrate the reaction mixture. After 5 hours of reaction time, when approximately 85 percent of the tetramers have been converted to the polymer polysiloxanes, the catalyst is neutralized by filtering and the volatile cyclics are distilled off to leave a substantially pure carboxypolysiloxane. By using beta-cyanoethyltetramethyldisiloxane as the chain-stopping unit instead of hexamethyldisiloxane, there can be obtained a linear polysiloxane having acid groups at terminal positions of the polymer chain, as well as the center position of the polymer chain. Such a polymer product permits esterification with an alcohol so that the alcohol groups are attached to terminal positions of the polymer chain, as well as to positions within the center of the polymer chain.

The alcohol employed in the present invention preferably is selected from the group of

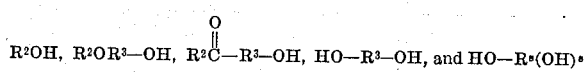

The radicals $R^2$ and $R^3$ appearing in the above formulas are well known in the art. The organic radicals represented by $R^2$ include monovalent hydrocarbon radicals. Thus, the radicals $R^2$ may be alkyl, such as methyl, ethyl, propyl, butyl, octyl; aryl radicals, such as phenyl, tolyl, xylyl, naphthyl radicals; aralkyl radicals, such as benzyl, phenylethyl radicals; and cycloalkyl radicals, such as cyclohexyl, cycloheptyl radicals. Generally, the radicals represented by $R^2$ are free from non-benzenoid unsaturation. Preferably the radicals represented by $R^2$ have less than eight carbon atoms and, in particular, it is preferred $R^2$ be methyl, ethyl, or phenyl. The radicals represented by $R^3$ may be any alkylene or arylene radicals of up to 20 carbon atoms, such as methylene, ethylene, various isomers of phenylene radicals or substituted phenylene radicals. $R^s$ is a polyvalent hydrocarbon radical with $s$ plus 1 hydroxyl groups attached thereto, and $s$ is a whole number that varies from 1 to 5. The preferred alcohol for esterification is methanol or $CH_3OCH_2CH_2OH$.

The catalyst employed in the present invention is a sorbent-acid system.

The sorbent used in the sorbent-acid system can be any solid carrier which is capable of sorbing the particular acid.

It is to be understood that the term "sorbent" is intended to include both adsorbents and absorbents. It is not the desire of the inventor at this time to be bound by any theories regarding adsorption or absorption phenomena. The preferred sorbents are siliceous materials such as diatomaceous earth and silica; carbonaceous materials such as charcoal, and carbon black. The most preferred sorbent is activated carbon.

The acids which are useful in the catalyst of the present invention can be any inorganic or any organic acid which in the reaction is capable of being sorbed by the solid carriers. Among the inorganic acids which are useful are hydrochloric acid, sulfuric acid, and sulfurous acid. Among the organic acids which are useful are the sulfonic acids such as benzene sulfonic acid, trifluoromethyl sulfonic acid, benzene disulfonic acid, the toluene sulfonic acids such as para toluene sulfonic acid, and the xylene sulfonic acids. The preferred acids are sulfuric acid, toluene sulfonic acids, xylene sulfonic acids, and trifluoromethyl sulfonic acid. The most preferred acid is sulfuric acid.

The preferred sorbent-acid systems are clay-trifluoromethyl sulfonic acid, clay-sulfuric acid, clay-toluene sulfonic acid, clay-xylene sulfonic acid, activated carbon-sulfuric acid, activated carbon-trifluoromethyl sulfonic acid, activated carbon-toluene sulfonic acid, and the diatomaceous earth-sulfuric acid. The most preferred sorbent-acid system is an activated carbon-sulfuric acid system.

The catalyst can contain from about 0.02 parts by weight to about 2 parts by weight of acid per part of sorbent, and preferably can contain from about 0.05 parts by weight to about 1.0 part by weight of acid per part of sorbent. The relative maximum amount of acid to sorbent can vary somewhat from the above numerical values since such amount depends upon the sorption capacity of the sorbent for the particular acid being employed. Excellent results are obtainable with a ratio of acid to sorbent of about 0.2 parts to 1 part for both type reactions. In addition, the sorbent-acid system can be used for continuous fixed bed processes when the sorbent is in granular form, that is, when its particle size is at least 20 mesh or smaller. Preferably, the ratio of acid to sorbent for a continuous fixed bed reactor system is about 0.02 to 1 part by weight.

The catalyst is added to the reaction mixture at a concentration of 0.1 to 10 percent by weight of acid and preferably 0.2 to 3 percent by weight of acid based on the esterification reactants.

The use of the sorbent-acid system instead of an acid catalyst per se greatly facilitates the removal of the catalyst from the reaction medium. The catalyst system can be removed by simple physical means such as filtration or centrifugation without the necessity of employing a neutralization step. Accordingly, since neutralization is not needed, the percent completion of the reaction is retained and reversion to the carboxylic acid does not occur. This in turn provides for higher yields and greater purity than previously obtained when employing acids per se. Moreover, since neutralization is not needed, the soaps which are formed when employing the acid per se are not produced in the reaction. As previously mentioned, these soaps are quite difficult to remove from the reaction product. Also, since the sorbent-acid system can be readily removed from the product, discoloration due to acid is virtually nonexistant.

Another advantage of the present invention is that the amount of acid needed in the catalyst system is less than the amount needed when employing the acid alone as catalyst. This is probably due to the effect of the sorbent which provides large surface area and enhances the contact between the acid and the reactants. A further advantage of the present invention is that a continuous fixed bed reaction system can be designed when employing a granular form sorbent. Such can not be produced from a catalyst employing only acid alone.

Moreover, the products obtained from the esterification process of the present invention meet all the above-discussed specifications for ester type brake fluids within a good margin of safety.

Further, although the reaction may be carried out at room temperature, it has been discovered that the esterification reaction proceeds too slowly at that temperature. Preferably, the reaction temperature is in the range of 70° to 150° C and more preferably in the range of 70° to 130° C.

Further, although the esterification may be carried out without a solvent, it is preferred to add a solvent to the reactants so as to azeotrope out the water of esterification that is formed while the esterification proceeds to completion. Such a solvent may be selected from xylene, toluene, benzene, and mineral spirits. Into the reaction vessel there is added the solvent, then there is added the carboxypolysiloxane and the catalyst. The reaction mixture is then heated above 50° C and preferably 70° to 130° C and at this time there is slowly added the alcohol to the reaction mixture. All of the alcohol is not added immediately but is added slowly during the course of the reaction. Preferably, one-half of the alcohol or one-third of the alcohol is added immediately at the beginning of the reaction and then the rest of the alcohol is added at subsequent points in the esterification reaction. The water that is formed in the esterification reaction is continually azeotroped with the solvent out of the reaction mixture so as to allow the esterification reaction to proceed to completion. Preferably, the esterification reaction takes from 1 to 10 hours and preferably from 5 to 10 hours. Thus, to allow the reaction to proceed with the continual removal of the water that is formed in the esterification reaction, it is desirable to add one-half of the alcohol to the reaction mixture at the beginning of the reaction and then after 2 or 3 hours have passed to add the rest of the alcohol to the reaction mixture. Conversely, the alcohol can be slowly and continuously added to the reaction pot in over a period of 3 to 7 hours from the initial beginning of the reaction. Preferably, the carboxypolysiloxane and the alcohol are reacted in stoichiometric amounts. However, it is not unusual and, in fact, it is desirable to add some alcohol in excess to the stoichiometric amount that is necessary to react with the carboxy groups in the polysiloxane. The excess amount of alcohol insures that the esterification of the carboxypolysiloxane will go to completion. In addition, it is most desirable to add at least 10 percent in excess of alcohol in the case where the alcohol is a polyol, that is, a dihydroxy alcohol or a trihydroxy, etc., type of alcohol. The excess alcohol is desirable in these cases where there is a polyol in order to prevent the formation of diesters. After the esterification reaction has proceeded to completion, that is after the preferable reaction time of 5 to 10 hours, the sorbent-acid catalyst is separated from the product by any convenient means of removal such as filtration or centrifugation. Also, for exceptionally pure materials, it may be desirable to add some additional sorbent at this stage of the process to aid in removing the last traces of acid catalyst. After this the solvent and the lower boiling siloxanes which are formed can be stripped off by boiling the reaction mixture at a temperature about 200° C and at atmospheric pressure or reduced pressure. The fluid remaining after this stripping step is the desired ester polysiloxane product.

It has been mentioned previously that the diorganosilane of formula (4) and the silane of formula (6) are standard materials well known in the prior art. In fact, the cyanosilane of formula (5) is also a well known standard material of the prior art. However, the process for producing it is somewhat involved. One method of producing the nitrile silane of formula (5) and, of course, the nitrile silane of formula (6), when there is a nitrile group attached thereto, is to react an olefinic cyanide with the alkylhydrochlorosilane in the presence of a three component catalyst system disclosed in Bluestein U.S. Pat. No. 2,971,970. This is an SiH-olefin addition reaction that is used to obtain the product. For instance, allyl cyanide may be reacted with methyldichlorosilane to obtain methyl-gamma-cyanopropyldichlorosilane. The reaction proceeds in the presence of a three-catalyst system which comprises a cuprous compound selected from the class consisting of cuprous halides and cuprous oxides, a diamine having the formula (10) $(R^4)(R^5)N(CH_2)_m N(R^5)_2$ where $m$ is an integer from 1 to 6, inclusive, $R^4$ is a lower alkyl radical and $R^5$ is a member selected from the class consisting of hydrogen, lower alkyl radicals, aminoalkyl radicals, alkyl-amino radicals and dialkylaminoalkyl radicals and mixtures thereof. In the preferred utilization of the catalyst, the catalyst system also includes a trialkylamine in addition to the cuprous compound and diamine previously mentioned, which trialkylamine is represented by the formula $(Y)_3N$ where Y is an alkyl radical.

In addition to the difunctional beta-cyanoalkylsilanes that can be produced by this catalyst system, it is also useful in the preparation of trifunctional and monofunctional beta-cyanoalkylsilanes, such as beta-cyanoethyltrichlorosilane, by the addition of trichlorosilane to acrylonitrile and beta-cyanoethylmethylchlorosilane by addition of methylchlorosilane to acrylonitrile. Utilizing this three or two-component catalyst system, a hydrolyzable silicon hydride is reacted with a beta-unsaturated olefinic nitrile where the hydrolyzable silicon hydride is described by the following formula:

(11) 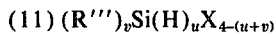

where $v$ is a whole number equal to from 0 to 1, inclusive, $u$ is an integer equal to from 1 to 3, inclusive, the sum of $u+v$ is from 1 to 3, inclusive, X is halogen or acyloxy or an alkoxy radical, and $R'''$ is as defined previously. The alpha-beta-unsaturated olefinic nitrile employed in the above process can be described by the following structural formula:

(12) 

where Y represents the same or different members selected from the class consisting of hydrogen and lower alkyl radicals, e.g., alkyl radicals having from one to eight carbon atoms. Among the specific nitriles within the scope of the above formula may be mentioned, for example, acrylonitrile, methacrylonitrile, ethylacrylonitrile, 1-cyanobutene-1, 2-cyanooctene-1, etc. The addition of the hydrolyzable silicon hydride within the scope of formula (4) to the alpha-beta-unsaturated olefinic nitrile results in the formation of a hydrolyzable beta-cyanoalkylsilane within the scope of formula (5).

As previously mentioned, one of the components of the multiple component catalyst system of the present process set forth is a diamine within the scope of formula (10). Specific diamines within the scope of formula (10) include, for example, N,N,N',N'-tetramethylethylenediamine, N,N,N',N'-tetraethylenediamine, etc. Another component of the catalyst system may be trialkylamine, which can include, for example, trimethylamine, triethylamine, tributylamine, triamylamine, trioctylamine, methyldiethylamine, dimethylbutylamine, methylbutyloctylamine, dimethyl-octa-decylamine, etc. In carrying out the reaction, the olefinic nitrile, the silicon hydride and the catalyst system are merely added to a suitable reaction vessel and maintained at a desired temperature for sufficient time to effect the reaction. The time required for effecting the reaction varies greatly, depending upon the particular reactant, the particular catalyst system employed and the temperature of the reaction. Of the various olefinic nitriles employed in the practice of this process, the fastest reaction rate is observed with acrylonitrile. As the acrylonitrile becomes more substituted, the reaction rate decreases. The reaction rate is also a function of whether the two-component catalyst system or the three-component catalyst system is employed. Reactions involving the three-component system of the diamine, the trialkylamine and the cuprous compound are generally faster than the reactions involved with the catalyst system which does not contain the trialkylamine. The reaction rate is also a function of the particular diamine employed, in either the two-component catalyst system or the three-component catalyst system. It has been discovered that the compound N,N,N',N'-tetramethylethylenediamine is by far the most efficient of the diamines and produces the most rapid reaction under the least vigorous reaction conditions for the best yields of the desired addition product. As the methyl groups are replaced with the hydrogen or alkyl radicals higher than methyl, the reaction rate begins to fall so that higher temperatures or higher catalyst concentration or longer reaction times are required to produce equivalent results. As mentioned previously, the multiple component catalyst composition can contain either two-components or three components, and except as noted, no critical catalyst component concentration has been found. The catalyst composition may be described broadly as being selected from the class consisting of (a) a first mixture of a diamine, a trialkylamine, and a cuprous compound selected from the class consisting of cuprous halides and cuprous oxides, and (b) a second mixture of a diamine and a cuprous compound selected from the class consisting of cuprous halide and cuprous oxide, the total number of atoms of nitrogen in each of said mixture being in excess of the total number of copper atoms in each of said mixtures. The requirement that the number of atoms of nitrogen be in excess of the number of atoms of copper in the catalyst mixture is a critical feature. In the preferred embodiment of the process, the catalyst composition comprises in a mole ratio basis, from 0.1 to 20 moles of diamine within the scope of formula (10), from 0 to 20 moles of trialkylamine and from 0.1 to 20 moles of a cuprous compound, again with the total number of nitrogen atoms being in excess of the number of moles of copper atoms.

In general, there should be at least about 10 percent excess of nitrogen atoms over copper atoms. Where all three components are present in the reaction mixture, the preferred composition on a mole ratio basis is from 0.1 to 20 moles each of the diamine, the trialkylamine and the cuprous compound. The amount of catalyst composition employed in relation to the monohydrolyzable silicon hydride and the olefinic nitrile may again vary within extremely wide limits. As is the case with most catalytic reactions, the rate of reaction increases as the catalyst concentration increases, and although no critical catalyst concentrations have been discovered, for economic reasons it is preferred to employ, on the basis of total moles of hydrolyzable silicon hydride and olefinic nitrile, at least 0.1 mole percent of the diamine and at least 0.1 mole percent of the cuprous compound. The ratio of the hydrolyzable silicon hydride to the alpha-beta-unsaturated olefinic nitrile may be varied within extremely wide limits. However, since the addition reaction involves 1 mole of the hydrolyzable silicon hydride for 1 mole of the alpha-beta-unsaturated olefinic nitrile, in the preferred embodiment of the process, equimolar amounts of reactants have been employed. The use of molar excesses of either of the two reactants is not precluded. Reactions have been effected with ten-fold molar excesses of either reactant. However, no particular advantage is derived from the excess of either reactant and, in fact, the economics of the reaction make it preferable to employ substantially equimolar amounts.

In carrying out the process, the hydrolyzable silicon hydride, the alpha-beta-unsaturated olefinic nitrile and the three components of the multiple component catalyst system are added to the reaction vessel in any order. There are no adverse affects by varying the order of addition of the reactants. In general, it is desirable to agitate the reaction mixture to obtain optimum reaction rates. However, agitation is not critical to the successful completion of the reaction. One of the most useful methods of agitating the reaction mixture is by heating the reaction mixture at a reflux temperature after the reaction is completed. General refluxing of the reaction mixture provides suitable agitation and optimum reaction rates.

Generally, the temperature of the reaction mixture varies during the course of the reaction and varies also depending on the particular reactants. Generally, however, the reflux temperature of the reaction is from about 50° C to about 130° C. In addition to refluxing the reaction mixture under atmospheric conditions, the reaction mixture may be heated at reflux temperature corresponding to reduced pressures or elevated pressures. At higher pressures, the reflux temperatures will increase correspondingly, for example, to a temperature of 120° to 150° C. While increasing the pressure, the reflux temperature under which the reaction is conducted increases the reaction rate somewhat, it has been found that the most convenient means of effecting the reaction is at atmospheric pressure in conventional equipment rather than in the pressure equipment required for higher pressure operation. It should also be understood that the reaction may be effected by placing the reactants in the pressure vessel and heating the contents of the vessel at an elevated temperature. In addition to conducting the reaction at the reflux temperature, the reaction will also proceed at temperatures as low as room temperature with or without agitation. The reaction may also be carried out in the presence or absence of inert solvents. Preferably, no inert solvent is used in the reaction. However, the use of solvents which are inert under the reaction conditions is not precluded. Such solvents include, for example, acetonitrile. Thus, the above process may be carried out to produce difunctional beta-cyanoalkylsilanes such as that of formula (5). However, this process, while it can be used to produce the difunctional beta-cyanoalkylsilanes of formula (5), it can also be used to produce monofunctional beta-cyanoalkylsilanes such as that of formula (6). Thus, by using this process, the cyanoalkylsilanes of formula (5) and formula (6) may be prepared so that in accordance with one embodiment of the present invention these cyanoalkylsilanes may be hydrolyzed with the diorganosilane of formula (3) to produce the carboxypolysiloxane of formula (2).

The estersilicone material prepared according to the present invention contains in its molecule at least one group of the formula:

(11)

wherein R, R', and n have the meanings defined previously and wherein E is selected from

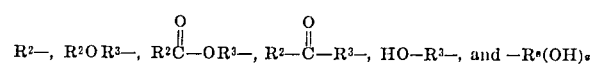

where the above symbols have the meanings defined previously.

The ester polysiloxanes which are suitable are brake fluids and prepared according to the present invention have the formula:

(12)
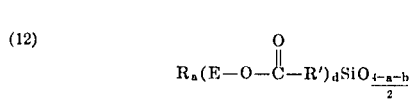

wherein R, R', E, a, and b have the meanings defined previously.

Further, depending on whether R'' is equal to a radical which is the same as the R''' radical or the nitrile radical, there are two most preferred types of compounds which are useful as brake fluids and which may be obtained by the process of the present invention and which are represented in formulas (13) and (14) below:

(13) $EOOCR'(R_2''')SiO-(R_2'''SiO)_y(R_2'''SiO)Sir_2'''R'COOE$
$R'COOE$

(14) $R_3'''SiO(R'''SiO)_y[R_2'''SiO]_zSiR_3'''$
$R'COOE$

Preferably the R's in formulas (13) and (14) are $C_gH_{2g}$ with g preferably being equal to 2 or 3. R', R''', E, y, and z have the meanings defined previously.

Some of the preferred esterified products which come within formulas (13) and (14) are useful as brake fluids and are as follows:

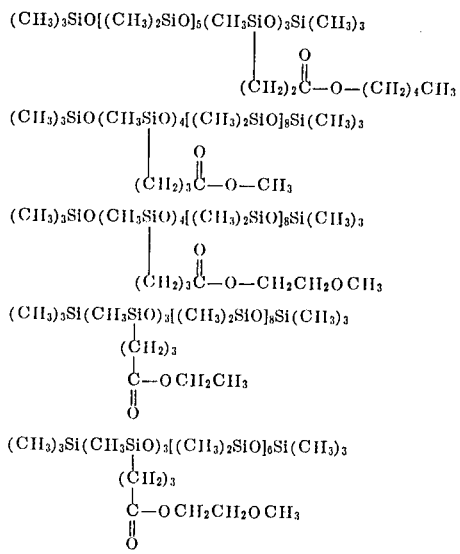

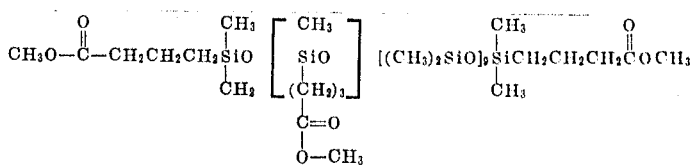

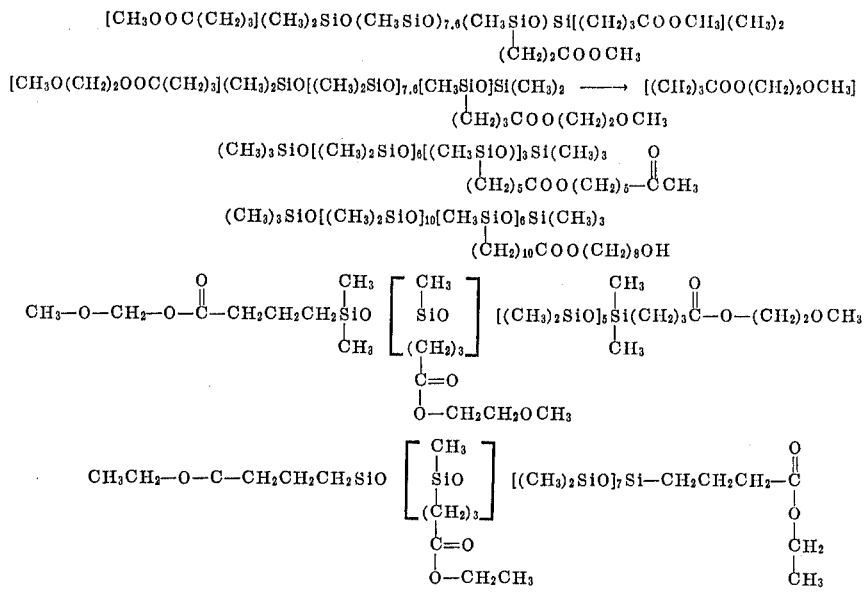

[CH₃OOC(CH₂)₃](CH₃)₂SiO(CH₃SiO)₇.₆(CH₃SiO) Si[(CH₂)₃COOCH₃](CH₃)₂
                                        |
                                    (CH₂)₃COOCH₃

[CH₃O(CH₂)₂OOC(CH₂)₃](CH₃)₂SiO[(CH₃)₂SiO]₇.₆[CH₃SiO]Si(CH₃)₂ ⎯⎯→ [(CH₂)₃COO(CH₂)₂OCH₃]
                                        |
                                    (CH₂)₃COO(CH₂)₂OCH₃

(CH₃)₃SiO[(CH₃)₂SiO]₆[(CH₃SiO)]₃Si(CH₃)₃     O
                        |                     ‖
                    (CH₂)₅COO(CH₂)₅—CCH₃

(CH₃)₃SiO[(CH₃)₂SiO]₁₀[CH₃SiO]₆Si(CH₃)₃
                        |
                    (CH₂)₁₀COO(CH₂)₈OH

The following non-limiting examples are given wherein all parts are by weight unless the contrary is stated:

EXAMPLE 1

A solution of 65 parts of trimethylchlorosilane and 150 parts of methyl-β-cyanoethyldichlorosilane is fed into an agitated reactor containing 224 parts of water over a period of 90 minutes. The reactor is equipped with a condenser. The temperature is maintained at 64°-65 C through external cooling and the reactor pressure varies from 6 to 8 pounds per square inch gauge. The reactor contents are then agitated for 4 hours at 100° to 101° C and 10 to 12 psig. A sample of the organic (silicone) phase from the reaction mixture is analyzed by infrared and no detectable nitrile found.

140 parts of water are added and the mixture agitated at 92° C for 1 hour to dissolve the ammonium chloride. After settling, the aqueous phase is drawn off and the silicone phase washed with 150 parts of water. A sample of the silicone phase is titrated and found to have a strong (mineral) acid value of 5.4 and a weak (carboxylic) acid value of 267.3.

115 parts of octamethylcyclotetrasiloxane are added to this carboxy silicone and the mixture refluxed at an absolute pressure of 28-30 mm. Water is separated from the liquid mixture of water and octamethylcyclotetrasiloxane flowing from the condenser back to the reaction vessel. A total of 8.4 parts of water is removed by this procedure.

The mixture of carboxy siloxane and octamethylcyclotetrasiloxane is equilibrated by adding 0.75 parts of sulfuric acid and 3.75 parts of activated carbon (Pittsburgh BL activated carbon)* (*Pittsburgh BL activated carbon is commercially available from Pittsburgh Activated Carbon Company, Calgon Center, Pittsburgh, Pennsylvania 15230, and according to the manufacturer has the following properties: total surface area (N₂ BET Method) — 1,000-1,100 m²/g; apparent density (bulk density, dense packing) — 0.51 g/cc; real density (He displacement) — 0.90 g/cc; specific heat at 100° C — 0.25; iodine number, minimum — 1,000 mg/g; molasses number, minimum — 230; ash, maximum — 8.5 wt. %; moisture, maximum, as packed — 2 wt. %; wet screen analysis, minus 325 U. S. mesh — 65-75 percent.) and agitating at a temperature of 100° C for 2 hours. A sample is removed from the reaction and filtered prior to analysis. Titration of the filtered sample gave a strong (mineral) acid value of 5.1 and a weak (carboxylic) acid value of 203.6.

50 parts of toluene, 12 parts of hexamethyldisiloxane, 37 parts of octamethylcyclotetrasiloxane, and 76 parts of methoxy ethanol are charged to the equilibrated carboxy siloxane in the reaction vessel. This mixture is heated to reflux. After 30 minutes of reflux, a separate phase consisting of water and methoxy-ethanol is removed from the reflux return line with the upper phase of toluene and methoxy ethanol being returned to reaction vessel. A total of 53.5 parts of the water-methoxy ethanol phase is removed from the reflux return line over a 2 hour reflux period.

29.1 parts of methoxy ethanol are slowly charged to the reaction mixture. Reflux with separation of water-methoxy ethanol phase from the reflux return line is continued for 2 hours and 10 minutes with 36.8 parts of water-methoxy ethanol phase collected.

Again, a third charge of 29.1 parts of methoxy ethanol is added to the reaction vessel. Refluxing is continued for another hour with 2.3 parts of water-methoxy ethanol phase collected.

17.5 parts of methoxy ethanol, 19 parts of toluene, and 3 parts of activated carbon (Pittsburgh BL) are charged to the reaction vessel and the mixture heated to reflux for 30 minutes. The toluene solvent and excess methoxy ethanol are then distilled off the product first at atmospheric pressure and then at a reduced pressure of 50 mm to a temperature of 129° C. The amount of distillate collected is 108 parts.

The reaction product is then filtered to remove the activated carbon. 286 parts of filtered product are collected. The product is an ester polysiloxane having the following properties and formula:

| | |
|---|---|
| strong (mineral) acid value: | 0.06 |
| weak (carboxylic) acid value: | 1.8 |
| viscosity at 25° D: | 22.2 centistokes |

$(CH_3)_3SiO[(CH_3)_2SiO][CH_3SiO]Si(CH_3)_3$
$\quad\quad\quad\quad\quad\quad\quad\quad\quad\quad |$
$\quad\quad\quad\quad\quad\quad\quad\quad\quad\quad C_2H_4COOCH_2CH_2OCH_3$ This ester polysiloxane meets all the specifications for a brake fluid within a good margin of safety.

EXAMPLE 2

Example 1 is repeated except that methoxy ethanol is replaced with equivalent moles of ethanol. Similar results are obtained except that the ester polysiloxane has the following formula:

$(CH_3)_3SiO[(CH_3)_2SiO][CH_3SiO]Si(CH_3)_3$
$\quad\quad\quad\quad\quad\quad\quad\quad\quad\quad |$
$\quad\quad\quad\quad\quad\quad\quad\quad\quad\quad C_2H_4COOCH_2CH_3$

What is claimed is:

1. In the process of preparing an organosilicone ester by reacting a carboxysilicone containing in its molecule at least one unit of the formula:

$$R_nSiO_{\frac{3-n}{2}}$$
$$|$$
$$R'COOH$$

wherein R is selected from monovalent hydrocarbon radicals, halogenated monovalent hydrocarbon radicals, and monovalent cyanoalkyl radicals; R' is selected from divalent hydrocarbon radicals, halogenated divalent hydrocarbon radicals, and divalent hydrocarbon radicals containing at least one ether linkage; and n varies from 0 to 3; and an alcohol selected from the group consisting of $$R^2CO; R^2OR^3OH; R^2\overset{O}{\overset{\|}{C}}R^3OH; HOR^3OH; \text{ and } HOR^s(OH)_s$$

wherein $R^2$ is a monovalent hydrocarbon radical, $R^3$ is a divalent hydrocarbon radical; $R^s$ is a polyvalent hydrocarbon radical with $s$ plus 1 hydroxyl group attached thereto, and $s$ is a whole number that varies from 1 to 5; the improvement which comprises conducting the reaction in the presence of an effective catalytic amount of sorbent-acid catalyst system.

2. The process of claim 1 wherein said carboxysilicone is a polysiloxane polymer of the formula:

$$R_a(HOOCR')_bSiO_{\frac{4-a-b}{2}}$$

wherein a varies from 1.1 to 2.02 and b varies from 0.023 to 1.00 and the sum of $a+b$ varies from 2.024 to 3.00.

3. The process of claim 1 wherein said carboxysilicone is a polysiloxane polymer of the formula:

$$R''R'''_2SiO(R'''SiO)_x(R'''SiO)_ySiR'''R''$$
$$\quad\quad\quad\quad\quad\quad\quad\quad |$$
$$\quad\quad\quad\quad\quad\quad\quad\quad R'COOH$$

wherein each $R'''$ individually is selected from the group of monovalent hydrocarbon radicals and halogenated monovalent hydrocarbon radicals; each $R''$ individually is selected from the group of $R'''$ and $-C_gH_{2g}CN$ wherein $x$ varies from 1 to 10; $y$ varies from 1 to 15, and $g$ varies from 1 to 20.

4. The process of claim 3 wherein R' is $-C_gH_{2g}$ and said polysiloxane polymer is obtained by reacting in the presence of water a diorganosilane of the formula:

$$R_2'''SiX_2$$

with a cyanoalkylsilane of the formula:

$$R'''Si(X_2)C_gH_{2g}CN$$

and a silane of the formula:

$$R''R_2''SiX$$

where $R'''$ is selected from monovalent hydrocarbon radicals and halogenated monovalent hydrocarbon radicals, R'' is the same as $R'''$ or $-C_gH_{2g}CN$, X is a hydrolyzable radical selected from halogen, alkoxy, aryloxy, and acyloxy radicals, $g$ is a whole number that varies from 1 to 20.

5. The process of claim 3 wherein R' is $C_gH_{2g}$ and said polysiloxane polymer is obtained by reacting in the presence of a strong base catalyst a cyclopolysiloxane of the formula:

$$(R_2'''SiO)_a$$

with a cyclopolysiloxane of the formula:

$$R'''(NCC_gH_{2g})SiO_b$$

with a disiloxane of the formula:

$$(R''R_2''Si)_2O$$

so as to equilibrate the reactants where $R'''$ is selected from monovalent hydrocarbon radicals and halogenated monovalent hydrocarbon radicals, R'' is the same as $R'''$ or $-C_gH_{2g}-CN$, $g$ is a whole number that varies from 1 to 20, $a$ and $b$ are whole numbers that vary from 3 to 10.

6. The process of claim 3 wherein R' is $-C_gH_{2g}$ and $g$ is equal to 3 or 4.

7. The process of claim 1 wherein said alcohol is methanol or methoxyethanol.

8. The process of claim 1 wherein said acid is selected from the group of sulfuric acid, sulfurous acid, hydrochloric acid, benzene sulfonic acid, benzene disulfonic acid, toluene-sulfonic acids, xylene-sulfonic acids, and trifluoromethyl sulfonic acid.

9. The process of claim 8 wherein said sorbent is selected from the group of siliceous material and carbonaceous material.

10. The process of claim 1 wherein said sorbent is selected from the group of siliceous material and carbonaceous material.

11. The process of claim 10 wherein said acid is sulfuric acid.

12. The process of claim 10 wherein said acid is paratoluene sulfonic acid.

13. The process of claim 1 wherein said sorbent is activated carbon.

14. The process of claim 1 wherein the amount of catalyst is from about 0.1 percent by weight of acid to about 10 percent by weight of acid based upon the weight of the reactants.

15. The process of claim 1 wherein the catalyst is a sorbent-acid system which contains from about 0.02 parts by weight to about 2 parts by weight of acid per part by weight of sorbent.

16. The process of claim 1 wherein an inert organic diluent is used.

17. The process of claim 1 wherein the esterification reaction is carried out at a temperature in the range of 70° to 150° C in a period of 1 to 10 hours.

* * * * *